United States Patent Office 3,195,551
Patented July 20, 1965

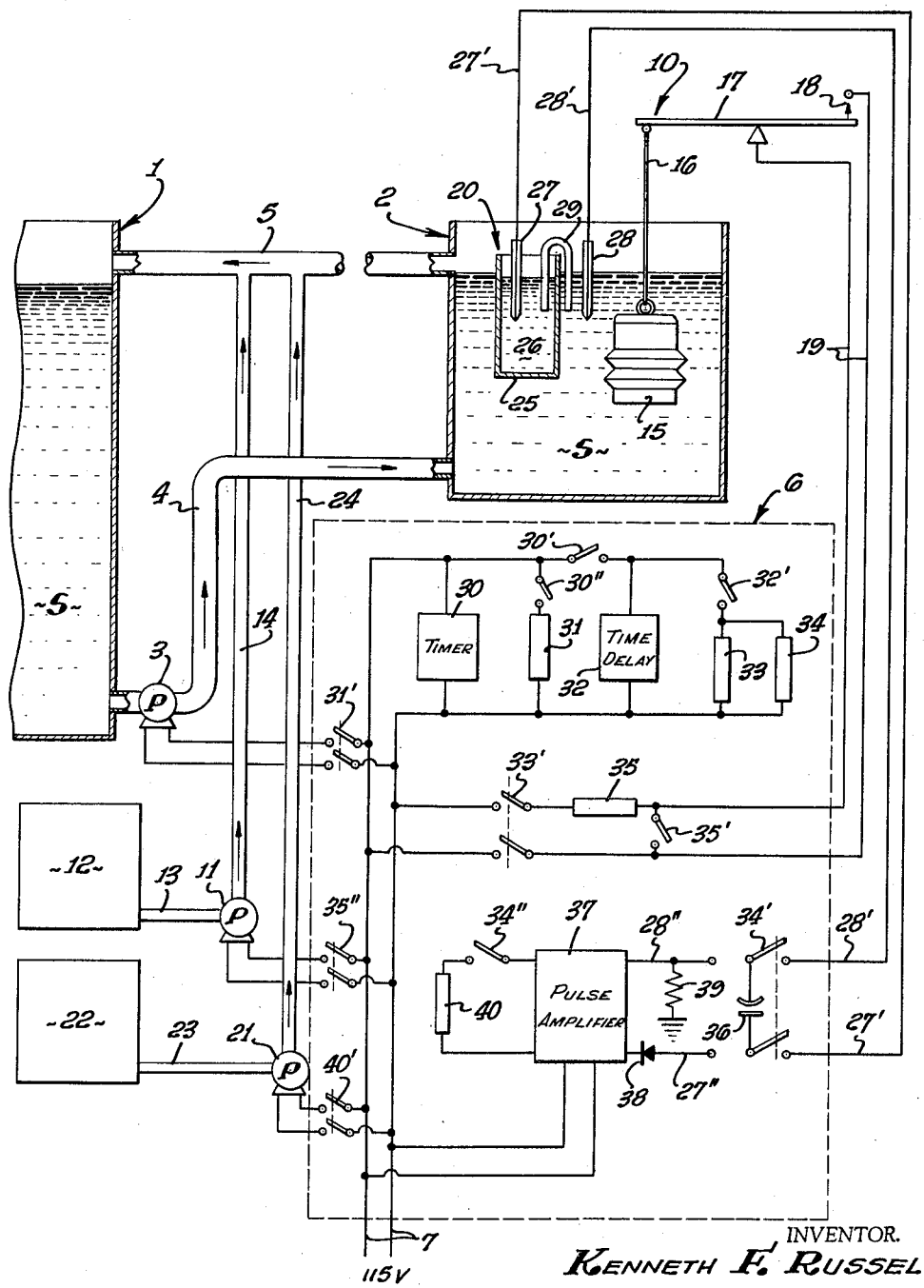

3,195,551
METHOD AND APPARATUS FOR THE MEASUREMENT AND CONTROL OF ACIDITY OF SOLUTIONS
Kenneth Freels Russell, Pomona, Calif., assignor to Brogdex Company, Pomona, Calif., a corporation of California
Filed Dec. 19, 1960, Ser. No. 76,736
4 Claims. (Cl. 137—5)

This invention relates to the measurement and control of solute concentration and acidity of any treating solution irrespective of the use to which the solution is being applied. More specifically this invention relates to the control of the concentration of fungicidal, sterilizing and other components of treating solutions used to wash, treat and sterilize citrus and other fruit, as well as to the control of acidity of such solutions.

In many chemical processes and operations, it is necessary to maintain the concentration of the solute in a treating solution within very narrow limits while the solute is being depleted during use. A simple method of measuring and controlling the concentration of solute would be to measure the density of the solution since density and concentration of solute are directly and simply related. However the concentration, density relationship has not been found practical for use in controlling the concentration of solute when a high degree of accuracy is necessary. One source of difficulty has been that for most solutes, even relatively large changes in solute concentration result in only small changes of solution density. For example a solution containing 3% NaOH has a density of 1.0318 gm./ml. while a 2% solution has a density of 1.0207 gm./ml. The very small difference of 0.0111 gm./ml. may spell the difference between success and failure of a process in which such solution is employed. In fruit treating solutions using sodium orthophenolphenate, it is desirable to keep the concentration at 0.5%±0.05%. An aqueous 0.5% solution of sodium orthophenolphenate and cleaning compounds at 100° F. has a specific gravity of 1.0054 with reference to pure water at 100° F. When the concentration is increased to 0.6% the specific gravity becomes 1.00648. Thus to maintain a 0.5% solution of sodium orthophenolphenate within ±0.05% at best one has only a specific gravity change of 0.00054 to use. Of course, in order to stay within the prescribed limits, one must be able to use considerably smaller specific gravity changes e.g. 0.0002 since the aforementioned specific gravity change only shows that the prescribed limit has been exceeded.

Another source of difficulty has been that a change in temperature causes a substantial change in the density of all solutions. In fact when the density change caused by temperature change is compared with the density change caused by the concentration change which must be utilized for control purposes, it is found that it is many times larger. For example, a change of temperature of water from 37° C. to 38° C. causes a density change of 0.99336 gm./ml. to 0.99299 gm./ml. or 0.00037 gm./ml. When this value is compared with the aforementioned value of 0.0002 for specific gravity change for use in controlling the concentration of sodium orthophenolphenate within 0.5%±0.05% concentration, it can be seen that a very small change in temperature changes the density of the solution as much as the concentration change to be used for control purposes since specific gravity is substantially numerically equivalent to density. Obviously the temperature effect has to be eliminated before density change can be used to control the concentration of a solution.

Similar to the concentration-density relationship, it has long been known that the acidity of pH i.e. the hydrogen ion concentration of a solution may be measured by the insertion of an electrode in the solution and connecting the electrode with a reference electrode to form a cell and measuring the potential difference across the cell by its current flow. For example, if a glass electrode is used with a reference calomel electrode and a salt bridge, the measured potential difference or E.M.F. is related to the pH by the following equation:

$$\mathrm{pH} = \frac{E - E_G{}^\circ - E_{ref.}}{0.05915} \quad (\text{at } 25^\circ \text{ C.})$$

wherein E is the measured potential difference in volts, $E_G{}^\circ$ is a constant potential in volts for the given glass electrode and $E_{ref.}$ is the known potential in volts of the calomel reference cell. From this equation it can be seen that a change of acidity of 0.1 pH unit produces an approximate change of 6 millivolts in the potential difference in the cell. However, it has been found experimentally that for the measurement of acidity at very low values i.e. very high values of pH e.g. a pH of 12, that the best available cell i.e. the glass electrode—calomel reference electrode cell does not obtain accurate, reliable values without resorting to elaborate precautions. Consequently, it has not been possible to industrially control, for example, the pH at 12±0.1 by the use of the change in potential difference caused by the change in pH. In addition, although accurate and reliable values of pH may be obtained in the range of 3 to 7, by use of the aforementioned cell, said cell and required instruments are very expensive so that there is no way to control acidity or pH at any value which is inexpensive.

These difficulties in the control of concentration and acidity are particularly pertinent to the fruit industry which must wash and sterilize large quantities of fresh fruit before it is shipped to market in order to minimize fruit loss due to decay and to improve saleability. In the case of citrus fruit, it has been found that sodium orthophenolphenate will inhibit blue and green mold on citrus fruit; however, it can be used only in very low concentrations since the U.S. Food and Drug Administration has set a tolerance of 10 parts per million permissible residue of sodium orthophenolphenol on the treated citrus fruit. The present practice in the citrus fruit industry is to add sodium orthophenolphenate in proportion to the water carried out of the treating tank by the citrus fruit. However, it has been found that pH must be closely controlled when sodium orthophenolphenate is used because if the pH drops below about 11.5 the citrus fruit may be "burned." It appears that below a pH of about 11.5, the sodium orthophenolphenate precipitates out of solution onto the fruit in its acid form. On the other hand, if the pH is allowed to go above about 12.5, the citrus fruit also will "burn" due to the strong alkalinity of the solution. The "burning" of cirtus fruit results in changes of appearance and characteristics of the citrus fruit which make it unsaleable. Consequently, citrus fruit industry has the particular problem of controlling an aqueous treating solution of a fungicide including also a cleaning composition accurately and reliably at very low value of funigicide concentration and simultaneously controlling the acidity value accurately and reliably at a very low concentration i.e. at a pH of about 12. In addition because of the large amount of citrus fruit which must be treated, this control must be done economically.

The present invention automatically, reliably and accurately controls both concentration and acidity of solutions even at very low values and, moreover, does it economically. More specifically the present invention can measure and control the acidity of a solution at a pH as high as 12 within an accuracy of 0.1%. The present invention can measure and control the concentration of a solute in solution as low as 0.5% by measurement and control of the solution density irrespective of temperature variations in the solution within an accuracy of 0.05%. The measurement and control of both acidity and concentration by the present invention is done with relatively simple, inexpensive equipment which is both reliable and automatic so that human error is eliminated in addition to improved accuracy without the necessity of investment in expensive, complex equipment.

The present invention involves both methods and apparatus for measuring and controlling the acidity and concentration of treating solutions. A representative sample of treating solution is obtained by means such as, circulating treating solution between a restricted sampling zone and the large body of treating solution. After the representative sample is obtained, its acidity is measured by inserting into it means for producing an electrical potential corresponding to the acidity of sample e.g. a glass electrode. A reference potential is set up which potential of a reference potential corresponds to the electrical potential of a reference solution at the desired acidity and at the temperature of the sample. For example a glass electrode may be inserted in said reference solution. Any stray electrical potential difference between the sample and the source of reference potential is equalized by an electrical conducting means between them. An electrical charge correlated to the difference between the sample potential and the reference potential is accumulated by means such as connecting a capacitor between said potentials. The discharge of said charge accumulation is used to control the addition of a predetermined amount of acidity control material to the large body of treating solution. The concentration of the representative sample of the treating solution is measured by buoyantly suspending therein a measuring body so that changes in the sample solute concentration cause corresponding movement of said measuring body. Preferably the measuring body has the same thermal expansion coefficient as the sample e.g. it comprises a body of solution containing the desired concentration of solute. The movement of said measuring body is used to control the addition of a predetermined amount of solute to the large body of treating solution. A cyclic time period control system periodically discharges the charge accumulation, energizes the solute addition control means and regulates the addition of acidity control material and solute.

One important feature of the present invention is the inexpensive, reliable and accurate means and method for measuring the difference between the desired acidity value and the actual acidity value and utilizing any difference to control the addition of acidity control solution. Unlike the prior art which uses two electrodes for each pH measurement, the present invention uses only a single electrode for each pH measurement. Unlike the prior art which utilized any difference in potential between the two measuring cells to cause a minute flow of current and thereby measure the pH, the present invention uses its difference of potential to charge a capacitor and measures the pH by the discharge of the accumulated charge difference across the capacitor. Consequently much smaller differences of pH can be measured accurately and reliably.

Another important feature of the present invention is the inexpensive, reliable and accurate means and method for measuring the concentration of a solution by measuring its density and eliminating any error due to density changes due to temperature changes. At present the prior art usually measures the density of a solution by measuring the loss of weight of a body of known density when inserted into the solution and then correcting by computation any density change due to temperature change. The present invention uses a measuring body which has the same coefficient of thermal expansion as the solution being measured whereby any change in the measured solution density due to temperature change is exactly compensated for by a change in the measuring body density so any temperature change will not cause movement of the measuring body.

Obviously, therefore, any movement of the measuring body will then be due solely to density changes caused by changes in solute concentration.

Another feature of the present invention is the inexpensive means and method of simultaneously controlling both the concentration and acidity of treating solutions. A single time period control system automatically and periodically discharges the electrical charge accumulation, energizes the solute addition control means and regulates the addition of acidity control material and solute.

An object of this invention is to inexpensively, reliably, automatically and accurately control the concentration and acidity of solutions.

Another object of this invention is an apparatus which controls inexpensively, reliably, automatically, and accurately the concentration and acidity of solutions.

Another object of this invention is to provide a method of controlling the concentration of a solution within narrow limits by density measurement whereby errors due to density variation due to temperature change are eliminated.

Another object of this invention is to control inexpensively the acidity of solutions irrespective of the desired value of acidity within narrow limits.

Another object of this invention is an inexpensive, reliable, automatic, accurate apparatus for controlling the washing and sterilizing of fruit by which the concentration and acidity of the fruit treating solution are maintained within very narrow limits at very low values.

Other objects and advantages of this invention will be readily apparent from the following description and the drawings in which is illustrated some exemplary embodiments of this invention.

FIG. 1 represents a simplified schematic diagram of a specific embodiment of the present invention including a reference solution to provide the reference potential and a measuring body with the same thermal expansion coefficient as the treating solution sample. However, the simplified schematic electrical control circuit shown in FIG. 1 is only one of many possible control circuits and is not considered per se a part of the present invention.

In FIG. 1 a large volume of treating solutions which may be a main tank or any system in which the treating solution is being employed is indicated at 1. In accordance with the present invention, a representative sample of such treating solutions is periodically obtained and contained in a sample tank 2, circulation of fluid from the main body of treating solution to sample tank 2 being accomplished by means of a pump 3, supply line 4, and a return line 5. The operation of pump 3 is controlled by the master control panel generally indicated at 6 so that pump 3 may be periodically stopped to permit the sample solution contained in tank 2 to become quiescent during periods of testing.

Immersed within the sample of solution S in tank 2 is a density measuring means generally indicated at 10 for automatically determining variations in solute concentrations and acidity measuring means generally indicated at 20 for automatically determining variations from desired pH. The density measuring means 10 (in a manner to be described hereinafter in greater detail) automatically energizes a feeding device such as pump 11 whereby either a concentrated solution of solute from tank 12 is supplied through intake line 13 and supply line 14 to the treating solution in tank 1 or a solute in solid or other form is added to the solution by a feeder of suitable construction. The acidity measuring means 20, similarly initiates the addition of a desired acidity control material or solution, as by energizing pump 21 which receives the desired acidity control material from a tank 22 through intake line 23 and supplies it by line 24 to the solution in the system. The responses of the density measuring means 10 and acidity measuring means 20 are regulated by the master control panel 6, during periods of time established by it. Power to the system is supplied by power lines 7.

The density measuring means 10 includes a measuring body 15 buoyantly suspended in the sample of solution S by a line 16. Measuring body 15 has the same thermal expansion coefficient as the sample of solution S since it consists of a closed expandable container completely filled with solution S at approximately the desired concentration. Line 16 is attached to one end of a beam balance 17. The other end of the beam balance forms one side of a contact switch 18 so that movement of the beam balance 17 operates contact switch 18. Contact switch 18 is connected through the master control panel 6 to the power supply lines 7 by electrical leads 19.

The acidity measuring means 20 includes a container 25 filled with a reference solution 26 at the desired acidity value. The container 25 is thermally conductive so that the temperature of reference solution 26 is maintained at the same temperature as the sample of solution S. Immersed in reference solution 26 is an electrode 27 which produces an electrical potential corresponding to the acidity of reference solution 26. Immersed in the sample of solution S is an electrode 28 which produces an electrical potential corresponding to the acidity of the sample solution. Connecting the reference solution 26 and the sample solution is an electrical conducting means 29 which equalizes any electrical potential differences between the solutions due to extraneous sources such as static electrical charges. Electrodes 27 and 28 are connected to the opposite sides of a capacitor 36 in the master control panel 6 by means of electrical leads 27' and 28' respectively and the relay switch 34' when said switch is in its capacitor charging position as described in detail below.

The master control panel 6 includes a cyclic timer 30 connected to power lines 7 which during a first time period opens timer switch 30' and closes timer switch 30" and during a second time period reverses said switch positions. A simple manner of achieving such operation is for the timer to include a roller on a rotating cam with raised and lowered portions corresponding to the first and second time periods whereby the change in roller position actuates the timer switches. When timer switch 30" is in its closed position, it energizes relay 31 which closes relay switch 31' whereby pump 3 is connected to power lines 7. When timer switch 30' is in its closed position, it energizes a time delay circuit 32 which after a set time period closes time delay switch 32'. When time delay switch 32' is in its closed position, it energizes relays 33 and 34. When energized relay 33 closes relay switch 33'. When energized relay 34 closes relay switch 34" and maintains the relay switch 34' in its capacitor discharging position as described in detail below.

Relay switch 33' in the master control panel 6 connects electrical leads 19 from the density measuring means to the power lines 7. Also the master control panel 6 includes relay 35 in one of the electrical leads 19. When relay 35 is energized by the closure of relay switch 33' and contact switch 18 then it closes relay switches 35' and 35". When closed relay switch 35' insures that relay 35 will remain energized while relay switch 35" connects pump 11 to power lines 7.

Relay switch 34' in the master control panel 6 is a double throw double pole switch connected across the capacitor 36. When relay switch 34' is in its capacitor charging position because relay 34 is de-energized, then capacitor 36 is connected between electrodes 27 and 28 by electrical leads 27' and 28' respectively. When relay switch 34' is in its capacitor discharging position because relay 34 is energized, then capacitor 36 is connected to pulse amplifier 37 by electrical leads 27" and 28". As shown electrical leads 27" and 28" include a rectifier 38 and a high resistance ground 39. The rectifier 38 permits capacitor 36 to discharge only in a single direction through pulse amplifier 37. As shown, capacitor 36 can discharge from the reference solution electrode 27 side to the sample solution electrode 28 side. The high resistance ground permits capacitor 36 to slowly discharge when it can not discharge through the pulse amplifier 37. The pulse amplifier 37 is connected to the power lines 7 and through relay switch 34" to relay 40. When energized by pulse amplifier 37 through relay switch 34", relay 40 closes relay switch 40' whereby pump 21 is connected to power lines 7.

For purpose of illustrating the operation of the system set forth in FIG. 1, it will be assumed that the treating solution S when used will increase in acidity i.e. decrease in pH and decrease in concentration from the desired acidity and concentration. Before operation the beam balance 17 is adjusted so that when measuring body 15 is immersed in a sample solution of the desired concentration, contact switch 18 is balanced in a slightly open position. Starting at the beginning of the first time period of timer 30, timer switch 30' opens and timer switch 30" closes. From the description of the master control panel 6, it can easily be seen that this actuates pump 3 to circulate treating solution S between the main tank 1 and sample tank 2 and connects capacitor 36 between electrodes 27 and 28. During the first time period of timer 30, a representative sample of treating solution S is obtained in the sample tank 2 by such constant circulation. Also since the treating solution S is assumed to decrease in pH, the reference solution electrode 27 will produce a larger electrical potential than sample solution electrode 28 so that capacitor 36 will accumulate a larger charge on the side connected to electrode 27. At the beginning of the second time period of timer 30, timer switch 30' closes and timer switch 30" opens. From the description of the master control panel it can easily be seen that this stops pump 3 and actuates time delay circuit 32. Consequently the solution in sample tank 2 becomes quiescent during the time delay period. After the time delay period, two events occur simultaneously. First, power is supplied to the density measuring means. Since the treating solution S is assumed to decrease in concentration, contact switch 18 will be closed due to the sinking of measuring body 15 in the less dense solution in sample tank 2. Consequently pump 11 will be actuated and the concentrated solution of solute from tank 12 will be added to tank 1. Second, capacitor 36 is discharged through pulse amplifier 37 so that pump 21 is actuated and the basic solution from tank 22 will be added to tank 1. It should be noted that if for any reason, the sample solution has a higher pH than the reference solution so that capacitor 36 is oppositely charged, it will not discharge through pulse amplifier 37 because of rectifier 38 so that no basic solution will be added. When the first time period of timer 30 begins again, it stops pumps 11 and 21, and again starts pump 3 and connects capacitor 36 between electrodes 27 and 28. Since pumps 11 and 21 are constant volume pumps operating for a known constant time period, the amounts of added solution can be controlled accurately. It can readily be seen from the description of the operation that when the concentration or pH of the treating solution do not decrease, its control solution will not be added.

A system was constructed essentially as shown in FIG. 1 to control the washing and sterilizing of oranges and grapefruit with a solution of 0.5% standard cleaning composition and 0.5% ±0.05 sodium orthophenolphenate at a pH of 12.0±0.1 and 100° F. The first timer period was 25 minutes and the second timer period was 5 minutes with 1 minute used by the time delay circuit. The reference solution was a mixture of disodium phosphate and sodium hydroxide adjusted to a pH of 12.1 i.e. slightly above the desired control point. Both electrodes were standard glass electrodes and the electrical conducting means 29 was simply a bundle of nylon strings in an insulating U-tube with one set of string ends inserted in the reference solution and the other set of string ends inserted in the sample solution. The measuring body was an expandible metal container completely filled so that it was partially expanded. The capacitor used had a capacity of a 1500 gallon treating tank through which an average of 600 pounds per minute of oranges or grapefruit were passed for 8 hours a day, 5½ days a week was controlled by this system. The acidity control solution used was a 50% NaOH solution and it was added in lots of 0.64 gallon since its pump capacity was 0.16 gallon per minute. The concentrated control solution used was a 10% solution of cleaning composition and sodium orthophenolphenate and it was added in lots of 1.6 gallons since its pump capacity was 0.4 gallon per minute. The treating tank solution was tested each week and found to remain within the concentration limits set for pH and sodium orthophenolphenate.

It is not necessary that a separate sampling tank be used in the present system. The sampling can be merely from an enclosure within the treating tank which permits free circulation of treating solution but which also protects against movement of the measuring body due to agitation of the treating solution. Also circulation of the sample solution may be obtained by use of a by-pass line on the main pump for circulation in the treating tank with a solenoid valve operated from the master control panel. Of course, if simple measurement or only semi-automatic operation is desired, the sample of the treating solution may be simply obtained manually by just dipping a container in the treating tank.

With respect to the acidity measuring means, the reference container need not be inserted in the reference solution but may be separately located so long as the reference solution in it is maintained at the same temperature as the sample solution. It is preferred to maintain a layer of a light immiscible, nonvolatile liquid such as oil, over the reference solution in the reference container to avoid contamination from the air. A separate electrical conducting means need not be used to equalize any potential differences between the reference solution and sample solution due to stray sources of electrical potential such as static electricity if the reference container has sufficient electrical conductivity without generating an electrical potential when in contact with the solutions used. Of course, the reference solution—reference electrode arrangement could be replaced by any source of electrical reference potential which gives the desired reference potential. Also it is preferred to place the rectifier after the pulse amplifier since the discharge from the capacitor is usually too small to be easily rectified. Finally, the capacitor need not be separated from the electrodes when it is discharged since the discharge, being substantially instantaneous, is not significantly affected by the extremely small steady charge from the electrodes. However, it is necessary that the capacitor be charged over a sufficiently long period of time so that even slight differences of acidity will actuate the addition of acidity control material.

In the specific system set forth above only increases in acidity are detected and controlled. However it may easily be converted to detect and control acidity decrease by reversing the electrode connections to the capacitor and substituting the addition of an acid solution for an alkaline solution. In addition, if both increases and decreases in acidity are to be controlled, the capacitor could be connected to two discharge electrical circuits so that the discharge of the capacitor in one direction goes through one circuit while the discharge in the opposite direction goes through the other circuit. One discharge circuit would control the addition of acid solution while the other would control the addition of alkaline solution.

With respect to the concentration measuring means, it is preferred to include an amplification circuit between the contact switch and the relay controlling the addition of concentration control solution. In this way, only a very small current need be sent through the contact switch which increases the sensitivity of the system and eliminates maintenance problems such as burning of the contact switch points due to high current loads. The use of the beam balance increases the sensitivity of the system and permits simple adjustment for the weight of the measuring body; however, if the measuring body is made with exactly the same density as the solution with the desired concentration, the beam balance need not be used and the movement of the measuring body may directly be used to operate the contact switch. It is preferred that a damper be used on the beam balance such as a plunger in a liquid-filled cylinder connected to the balance arm but the measuring body may itself sufficiently dampen any erratic movement of the beam balance. Of course, the measuring body need not have the same coefficient of thermal expansion as the sample solution if the sample solution is maintained at a constant temperature. Such constant temperature could be obtained simply by heating the incoming sample solution with a resistance heater controlled by a thermostat immerced in the sample solution in the sample tank.

With respect to the control system, the control of concentration may be independent of the control of acidity; however by use of the same control system and the same time periods, the resulting system is simpler and more economical. It is preferred to use a second timer in parallel with the first timer to control the addition of both the acidity control material and solute since this insures that if one timer fails, the proper amount will still be added. Such safety feature is important because otherwise one time failure could cause the loss of thousands of dollars due to "burnt" fruit. Of course, either the flow or non-flow of current in the control circuits could be used to control the addition of acidity control material and solute. For example, unlike the above described specific embodiment, solute and acidity control material may be added at regular intervals unless prevented by flow of current in the control circuits. Also, all parts of the control system, as well as the acidity measuring means and density measuring means should be properly grounded so that electrical potentials from stray sources will not affect the operation of the system. Finally, any convenient means may be used to add solute and acidity control material. For example, solutions of them may be added by gravity flow controlled by solenoid valves or they may be added in solid form by an automatic feeding device.

The foregoing description with its specific embodiment and its variations and modifications is only illustrative of the present invention and is not a limitation on its scope. All alterations, modifications and variations of the present invention coming within the scope of the following claims are considered part of the present invention.

I claim:

1. In a method of precisely maintaining within preselected narrow limits acidity of a large body of treating solution, the steps of: periodically obtaining a sample of the treating solution from said treating solution and retaining said sample solution for a selected period of time; holding a reference solution immersed in said sample solution for equalizing temperatures of said solutions and for equalizing stray potential differences between said solutions; obtaining an electrical potential related to the acidity of the sample solution; obtaining an electrical potential related to acidity of a reference solution; accumulating an electrical charge related to the difference of the electrical potential of the sample solution with respect to the electrical potential of the reference solution; discharging the electrical charge after a selected period of time; and regulating the introducion of acidity control material to the treating solution in response to said discharge.

2. An apparatus for controlling within narrow limits acidity of a body of treating solution for use on fruit and the like comprising: a receptacle for holding a sample of said treating solution and in fluid communication with the body of treating solution; a container at least partially immersed in said sample solution and having a reference solution of desired acidity therein, said container being provided with means for equalizing stray electrical potential differences between said sample and reference solutions; an electrode in said reference solution and an electrode in said sample solution, said electrodes reducing an electrical potential corresponding to the acidity of their respective sample and reference solutions; condenser means for accumulating a charge produced by the difference in electrical potentials of said electrodes; timing means for periodically discharging said electrical charge accumulated in said condenser means; and means responsive to said discharge for introducing a predetermined quantity of acidity control material to said treating solution.

3. An apparatus as stated in claim 2 wherein said means for equalizing stray electrical potential differences between said sample and reference solutions includes the material of said container.

4. An apparatus as stated in claim 2 wherein said means for equalizing stray electrical potential differences between said sample and reference solutions includes a conductor extending between said sample and reference solutions, said conductor including a material which will not generate an electrical potential when in contact with said solutions.

References Cited by the Examiner
UNITED STATES PATENTS

| | | | |
|---|---|---|---|
| 2,037,328 | 4/36 | Huberti | 73—450 |
| 2,132,015 | 10/38 | Collins | 73—450 |
| 2,190,835 | 2/40 | Gruss | 324—30.2 XR |
| 2,560,857 | 7/51 | Gambetta | 324—30 |
| 2,663,308 | 12/53 | Hodgens | 137—93 |
| 2,769,072 | 10/56 | Obenshain | 324—30 XR |
| 2,815,763 | 12/57 | Fanselow | 137—92 |
| 2,819,726 | 1/58 | Rendel | 137—93 |
| 2,834,654 | 5/58 | Murayama | 324—30 XR |
| 2,922,105 | 1/60 | Estelle | 324—30 |
| 2,939,070 | 5/60 | Rosenthal | 324—30 |
| 2,955,459 | 10/60 | Cihelka | 137—92 XR |
| 2,998,019 | 8/61 | Adelson | 137—92 |

ISADOR WEIL, *Primary Examiner.*